March 12, 1940. J. W. LEIGHTON 2,193,137
INDIVIDUAL SPRINGING
Filed Aug. 26, 1937
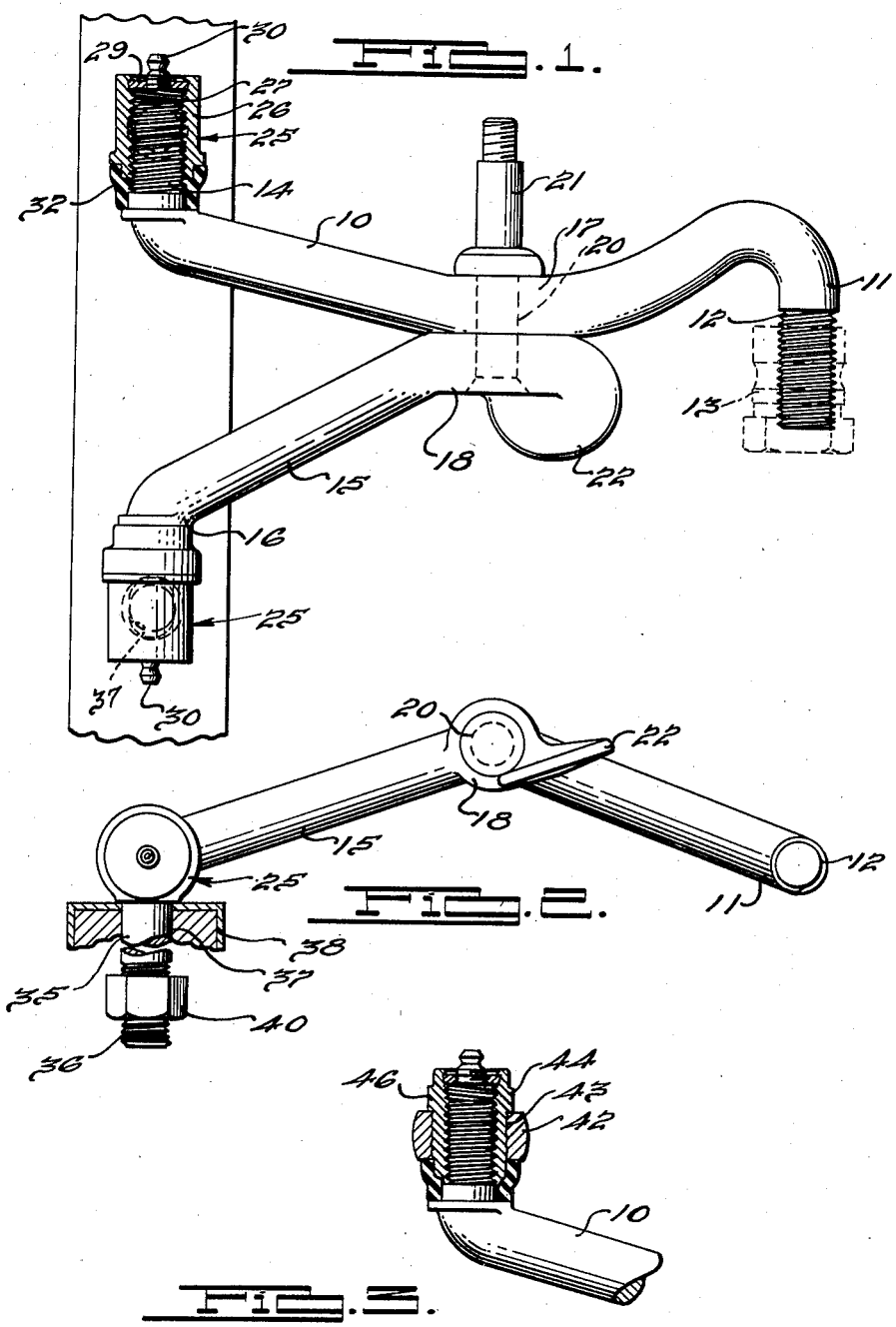
INVENTOR
John W. Leighton.
BY Harness, Dickey & Pierce.
ATTORNEYS.

Patented Mar. 12, 1940

2,193,137

UNITED STATES PATENT OFFICE 2,193,137

INDIVIDUAL SPRINGING

John W. Leighton, Port Huron, Mich.

Application August 26, 1937, Serial No. 161,094

3 Claims. (Cl. 267—20)

The invention relates generally to motor vehicles and it has particular relation to an arm for an individual wheel springing.

One object of the invention is to provide an improved, simple and less expensive control arm for pivotally connecting a wheel to a vehicle frame.

Another object of the invention is to provide an improved means for pivotally connecting a control arm to the motor vehicle frame.

Other objects of the invention will become apparent from the following specification, from the drawing to which it relates, and from the claims hereinafter set forth.

For a better understanding of the invention reference may be had to the drawing wherein:

Figure 1 is a plan view of an upper control arm for an individual spring as constructed according to one form of the invention.

Fig. 2 is an elevational view of the construction shown by Fig. 1;

Fig. 3 is a fragmentary view showing another form of the invention.

Referring to Figs. 1 and 2, the control arm comprises a bar 10 constructed from round bar stock, which at its outer end is bent to form a projection 11 adapted to be pivotally connected to a wheel mounting member. This projection is threaded as indicated at 12, and may be connected to the wheel mounting member by means of an eccentric bushing 13 threaded thereon. While the wheel mounting member is not illustrated, it will be understood that it may comprise a member having an eye portion receiving the bushing 13 and which is clamped around the latter. At its opposite end the bar 10 is bent reversely as compared to the projection 11, and this is threaded as indicated at 14. A second bar indicated at 15 also has a bent threaded portion 16 like the portion 14, and these two threaded portions are axially aligned. The bars 10 and 15 have upset flattened portions 17 and 18 that are riveted together by means of a rivet pin 20 and the latter at the side of the bar 10 has a bearing portion 21 adapted to be connected to one end of a shock absorber. Beyond the rivet 20, the bar 15 has a portion upset and flattened to provide a projection 22 adapted for engagement with a wheel lifting jack.

For pivotally and threadably connecting the threaded ends 14 and 16 to the frame of the automobile, a stud element 25 is provided for each end, and each of these elements includes a tubular portion 26 having internal threads 27 of the same character as the threads on the ends of the bars. At its outer end the tubular portion 26 has a Welch plug 29 therein, which has a grease fitting 30 threaded thereinto so as to enable the injection of lubricant into the tubular portion and around the threads. A rubber sleeve 32 surrounds the opposite end of the tubular portion and a part of the bar adjacent thereto so as to seal the threaded bearing against escape of lubricant and entrance of dirt.

It will be understood that the threaded bearing is the same in each instance and that the threads are of the same character. By this is meant that the threads in each bearing will have the same pitch and lead and both will be of right or left hand direction as the case may be. In this connection it may be pointed out that the therads 12 at the outer end of the control arm will be of the same character as the threads at the inner ends thereof so that any oscillatory movement of the arm in a vertical direction substantially will not cause any movement of the wheel mounting member longitudinally of the vehicle. It will be understood that during oscillatory movement of the control arm that the inner ends may move longitudinally in one direction a slight amount caused by the travel of the threads but a reverse oscillatory movement of the wheel member will occur so that it will travel in the opposite direction substantially an amount equal to the travel of the inner end.

As best shown by Fig. 2, each stud element 26 has an integral stud portion 35, which is threaded as indicated at 36. These stud elements respectively are adapted to project through openings 37 in the chassis frame indicated at 38. One of the openings 37 is slightly elongated longitudinally of the frame so as to compensate for any variation in the longitudinal distance between the two studs. This will enable inserting the studs through the openings therefor and securely fastening them to the frame by means of nuts 40 on the studs, while leaving the threaded bearings clear and free of any binding or unusual frictional engagement such as might occur if there was any strain tending to move either bushing longitudinally of its threaded bearing.

The construction shown by Fig. 3 differs from the construction previously described in that a stud member 42 is provided which has a stud portion the same as the portion 35 and an eye 43 at the upper end of the latter into which a bushing 44 is threaded. The eye and bushing have so-called locking thread engagement 45, or in other words the thread is of obtuse angle and when the bushing is threaded into the eye until a head 46 on the former engages the side of the eye, the frictional engagement between the obtuse angle threads tightly locks the bushing in place. The construction is substantially the same as far as operation is concerned, as the construction previously described.

In either arrangement, the stud elements may be quickly spun or turned onto the threaded ends of the control arm until in approximately proper position. As so assembled, each threaded bearing is freely pivotal as the threads are matched in each. This relation is not disturbed when the stud portions are dropped into the openings 37 in the frame and, in the event slight variations occur in the spacing of the stud portions, the slightly elongated opening 37 will allow for this and avoid axial pressure on the threads in the bearings. Moreover, the axis of each stud portion intersects the axis of the threaded bearing and it follows that turning of the stud element about the axis of the stud portion may occur if necessary to allow the tubular portion or bushing to be perfectly aligned with the threaded end of the control arm engaging it.

Although more than one form of the invention has been described and illustrated in detail, it will be apparent to those skilled in the art that various modifications may be made without departing from the scope of the appended claims.

What is claimed is:

1. In combination with an automobile frame member, a pivotal wheel supporting arm, and means pivotally connecting the arm to the frame member and comprising a stud projecting at one end through an opening in the frame member and fastened thereto, the opposite end of the stud having an upset apertured portion, an internally threaded bushing fastened in the aperture, and means on the arm and having pivotal threaded engagement with the threads in the bushing.

2. In combination, a frame, wheel supporting means including rigidly connected arms projecting laterally from the frame and having aligned and spaced externally threaded bearing portions at their inner ends, and means pivotally connecting each arm bearing portion to the frame including a stud projecting at one end through an opening in the frame member and fastened thereto, the opposite end of each stud having an upset, apertured portion provided with internal bearing threads threadedly receiving one of the arm bearing portions, one of the openings in the frame being enlarged relative to the stud and each stud being adjustably turnable about its own axis to enable matching of the threads and alignment of the openings in the two bearings.

3. In combination, a frame, wheel supporting means including rigidly connected arms projecting laterally from the frame and having aligned and spaced externally threaded bearing portions at their inner ends, and means pivotally connecting each arm bearing portion to the frame including a stud projecting at one end through an opening in the frame member and fastened thereto, the opposite end of each stud having an upset, apertured portion, one of the threaded arm bearing portions projecting into the aperture in one stud and having pivotal threaded bearing engagement therewith, an internally and externally threaded bushing fixedly threaded into the opening in the other stud and having pivotal threaded bearing engagement with the other arm bearing portion, each stud being adjustably turnable about its own axis to enable aligning the openings in the studs.

JOHN W. LEIGHTON.